(12) United States Patent
Rahmouni et al.

(10) Patent No.: US 11,671,707 B2
(45) Date of Patent: *Jun. 6, 2023

(54) SYSTEMS AND METHODS FOR DYNAMIC STABILIZATION ADJUSTMENT

(71) Applicant: GoPro, Inc., San Mateo, CA (US)

(72) Inventors: Nicolas Rahmouni, Paris (FR); Maxim Karpushin, Paris (FR); Thomas Derbanne, Paris (FR)

(73) Assignee: GoPro, Inc., San Mateo, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/372,027

(22) Filed: Jul. 9, 2021

(65) Prior Publication Data

US 2021/0337124 A1    Oct. 28, 2021

Related U.S. Application Data

(63) Continuation of application No. 16/719,005, filed on Dec. 18, 2019, now Pat. No. 11,064,118.

(51) Int. Cl.
*H04N 23/68* (2023.01)
*H04N 5/262* (2006.01)

(52) U.S. Cl.
CPC ......... *H04N 23/683* (2023.01); *H04N 5/2628* (2013.01); *H04N 23/6812* (2023.01)

(58) Field of Classification Search
CPC ........... H04N 5/23258; H04N 5/23261; H04N 5/23254; H04N 5/23267; H04N 5/23274; H04N 23/683; H04N 23/6812
See application file for complete search history.

(56) References Cited

U.S. PATENT DOCUMENTS

| | | | |
|---|---|---|---|
| 7,969,496 B2 | 6/2011 | Pilu | |
| 9,092,861 B2 | 7/2015 | Bennett | |
| 9,389,431 B2 | 7/2016 | Wall, III | |
| 9,413,963 B2 | 8/2016 | Beysserie | |
| 9,674,438 B2 | 6/2017 | Zhou | |
| 9,706,123 B2 | 7/2017 | Beysserie | |
| 9,787,893 B1 | 10/2017 | Nenonen | |
| 10,116,866 B2 * | 10/2018 | Karpenko | H04N 5/23248 |
| 10,165,222 B2 | 12/2018 | Baran | |
| 10,341,564 B1 | 7/2019 | Derbanne | |
| 10,432,864 B1 | 10/2019 | Douady | |
| 10,536,643 B1 | 1/2020 | Douady | |
| 10,574,894 B2 | 2/2020 | Derbanne | |
| 10,587,807 B2 | 3/2020 | Derbanne | |
| 10,587,808 B2 | 3/2020 | Derbanne | |
| 10,750,092 B2 | 8/2020 | Douady | |
| 10,958,840 B2 | 3/2021 | Douady | |
| 11,064,118 B1 * | 7/2021 | Rahmouni | H04N 5/23258 |
| 11,258,949 B1 * | 2/2022 | Huang | H04N 5/23238 |
| 11,336,832 B1 * | 5/2022 | Stimm | G06T 5/006 |
| 2012/0206565 A1 | 8/2012 | Villmer | |
| 2013/0342714 A1 | 12/2013 | Zhou | |
| 2014/0303687 A1 | 10/2014 | Wall | |
| 2015/0254871 A1 * | 9/2015 | MacMillan | H04L 65/612 382/180 |

(Continued)

*Primary Examiner* — John Villecco
(74) *Attorney, Agent, or Firm* — Esplin & Associates, PC

(57) ABSTRACT

An image capture device may capture visual content during a capture duration. The context of capture of the visual content by the image capture device may be assessed and used to determine values of stabilization parameters for the visual content.

20 Claims, 5 Drawing Sheets

(56) References Cited

U.S. PATENT DOCUMENTS

| | | |
|---|---|---|
| 2015/0350548 A1 | 12/2015 | Beysserie |
| 2016/0006935 A1 | 1/2016 | Zhou |
| 2016/0337589 A1 | 11/2016 | Beysserie |
| 2017/0041545 A1 | 2/2017 | Murgia |
| 2018/0338132 A1 | 11/2018 | Rao Padebettu |
| 2019/0189160 A1* | 6/2019 | Huang .................... G06T 7/73 |
| 2019/0356851 A1 | 11/2019 | Ayalasomayajula |
| 2019/0356856 A1 | 11/2019 | Derbanne |
| 2019/0356857 A1 | 11/2019 | Derbanne |
| 2019/0379834 A1 | 12/2019 | Derbanne |
| 2020/0092451 A1 | 3/2020 | Douady |
| 2020/0092480 A1 | 3/2020 | Douady |
| 2020/0120252 A1 | 4/2020 | Douady |
| 2020/0177813 A1 | 6/2020 | Derbanne |
| 2020/0374442 A1 | 11/2020 | Douady |
| 2022/0279128 A1* | 9/2022 | Stimm ............ H04N 5/232935 |

* cited by examiner

SYSTEMS AND METHODS FOR DYNAMIC STABILIZATION ADJUSTMENT

FIELD

This disclosure relates to determining stabilization parameter values to stabilize visual content based on context of capture of the visual content.

BACKGROUND

A video may have been captured by an image capture device in motion. The motion of the image capture device during the capture of the video may cause the video to appear jerky/shaky. Different types of motion of the image capture device may cause different moment within the captured video. A single tuning of stabilization may not work for all types of motion of the image capture device.

SUMMARY

This disclosure relates to dynamic stabilization adjustment. Visual information and/or other information may be obtained. The visual information may define visual content of a video. The visual content may be captured by an image capture device during a capture duration. The visual content may have a field of view. Context of the capture of the visual content by the image capture device may be assessed as a function of progress through the capture duration. One or more values of one or more stabilization parameters for the visual content may be determined as the function of progress through the capture duration based on the context of the capture of the visual content by the image capture device and/or other information. Stabilization of the visual content as the function of progress through the capture duration may be effectuated based on the value(s) of the stabilization parameter(s) and/or other information.

A system that dynamically adjusts stabilization may include one or more electronic storages, one or more processors, and/or other components. An electronic storage may store visual information, information relating to visual content, information relating to capture of visual content, information relating to context of capture of visual content, information relating to stabilization parameters, information relating to stabilization of visual content, and/or other information.

The processor(s) may be configured by machine-readable instructions. Executing the machine-readable instructions may cause the processor(s) to facilitate dynamic stabilization adjustment. The machine-readable instructions may include one or more computer program components. The computer program components may include one or more of a visual information component, a context component, a stabilization parameter component, a stabilization component, and/or other computer program components.

The visual information component may be configured to obtain visual information and/or other information. The visual information may define visual content of a video. The visual content may have a field of view. The visual content may be captured by an image capture device during a capture duration.

The context component may be configured to assess context of the capture of the visual content by the image capture device. The context of the capture of the visual content by the image capture device may be assessed as a function of progress through the capture duration. In some implementations, the context of the capture of the visual content by the image capture device may include motion of the image capture device. The motion of the image capture device may include rotational velocity and/or rotational acceleration of the image capture device.

In some implementations, the context of the capture of the visual content by the image capture device may include a motion type of the image capture device. The context of the capture of the visual content by the image capture device may further include a mounting type of the image capture device.

In some implementations, the context of the capture of the visual content by the image capture device may include an environment of the image capture device.

The stabilization parameter component may be configured to determine one or more values of one or more stabilization parameters for the visual content. The value(s) of the stabilization parameter(s) may be determined as the function of progress through the capture duration based on the context of the capture of the visual content by the image capture device and/or other information.

In some implementations, determination of the value(s) of the stabilization parameter(s) for the visual content as the function of progress through the capture duration based on the context of the capture of the visual content by the image capture device may include determination of different values of the stabilization parameter(s) for different context of the capture of the visual content by the image capture device.

In some implementations, the visual content may be stabilized based on a punchout of one or more extents of the visual content. The punchout may be placed within the field of view of the visual content. In some implementations, the stabilization parameter(s) may include a stickiness parameter and/or other stabilization parameters. The stickiness parameter may control an extent to which placement of the punchout within the field of view of the visual content follows motion of the image capture device. In some implementations, the stabilization parameter(s) may include a weight balance parameter and/or other stabilization parameters. The weight balance parameter may control an extent to which placement of the punchout within the field of view of the visual content compensates for rotational velocity and/or rotational acceleration of the image capture device.

The stabilization component may be configured to effectuate stabilization of the visual content. The stabilization of the visual content may be effectuated as the function of progress through the capture duration based on the value(s) of the stabilization parameter(s) and/or other information. In some implementations, the visual content may be stabilized based on a punchout of one or more extents of the visual content, with the punchout placed within the field of view of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form

DETAILED DESCRIPTION

Figure 1:
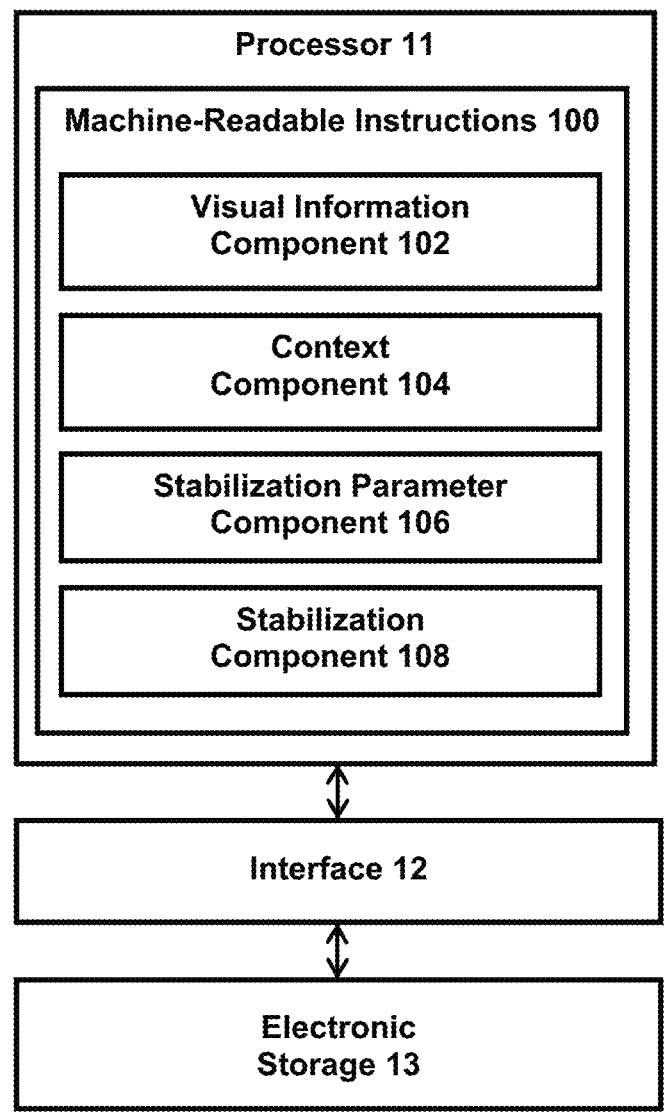
FIG. 1 illustrates an example system that dynamically adjusts stabilization.

FIG. 1 illustrates a system 10 for dynamic stabilization adjustment. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Visual information and/or other information may be obtained by the processor 11. The visual information may define visual content of a video. The visual content may be captured by an image capture device during a capture duration. The visual content may have a field of view. Context of the capture of the visual content by the image capture device may be assessed by the processor 11 as a function of progress through the capture duration. One or more values of one or more stabilization parameters for the visual content may be determined by the processor 11 as the function of progress through the capture duration based on the context of the capture of the visual content by the image capture device and/or other information. Stabilization of the visual content as the function of progress through the capture duration may be effectuated by the processor 11 based on the value(s) of the stabilization parameter(s) and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to capture of visual content, information relating to context of capture of visual content, information relating to stabilization parameters, information relating to stabilization of visual content, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate dynamic stabilization adjustment. The machine-readable instructions 100 may include one or more computer program components. The machine-readable instructions 100 may include one or more of a visual information component 102, a context component 104, a stabilization parameter component 106, a stabilization component 108, and/or other computer program components.

Visual content (of image(s), of video frame(s), of video(s)) with a field of view may be captured by an image capture device during a capture duration. Visual content may refer to content of image(s), video frame(s), and/or video(s) that may be consumed visually. For example, visual content may be included within one or more images and/or one or more video frames of a video. A video frame may refer to one or more of an image frame, frame of pixels, encoded frame (e.g., I-frame, P-frame, B-frame), and/or other types of video frame. The video frame(s) may define the visual content of the video. That is, video may include video frame(s) that define the visual content of the video. Video frame(s) may define visual content viewable as a function of progress through the progress length of the video content. A video frame may include an image of the video content at a moment within the progress length of the video.

A field of view of visual content may define a field of view of a scene captured within the visual content. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects).

A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11 and/or the electronic storage 13. References to a housing of an image capture device may refer to the image capture device, and vice versa. For example, references to position/motion of a housing of an image capture device may refer to position/motion of the image capture device, and vice versa.

Figure 3:
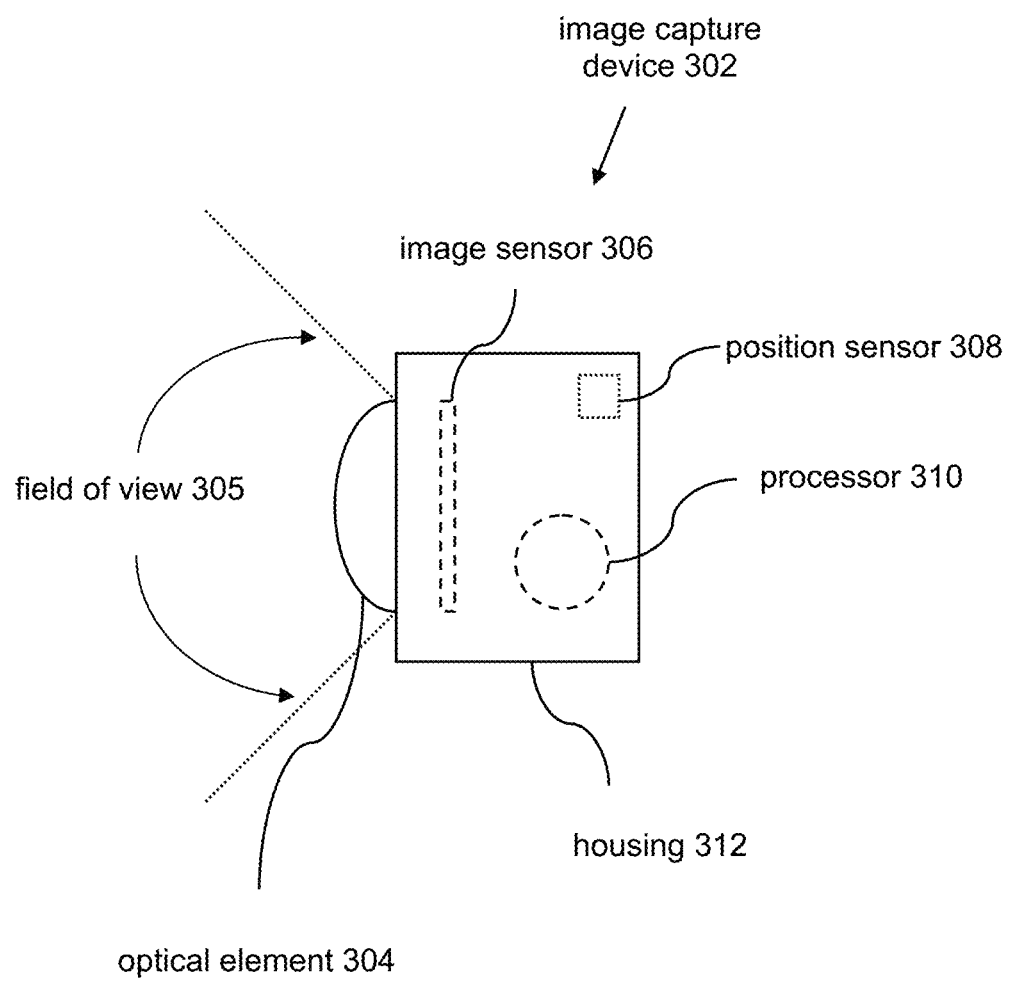
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) an optical element 304, an image sensor 306, a position sensor 308, a processor 310, and/or other components.

One or more components of the image capture device 302 may be the same as, be similar to, and/or correspond to one or more components of the system 10. For example, the processor 310 may be the same as, be similar to, and/or correspond to the processor 11. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The position sensor 308 may include sensor(s) that measures experienced positions and/or motions. Positions may include rotational positions (orientations) and/or translational positions. Motions may include rotational motions (changes in orientation) and/or translational motions (e.g., forward/backward motion, left/right motion, up/down motion). The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the image capture device 302 during the capture duration. The position output signal may convey position information that characterizes positions of the image capture device 302 at different moments (points in time, time durations) within the capture duration. The position information may characterize positions of the image capture device 302 as a function of progress through the capture duration. The position information may characterize positions of the image capture device 302 based on specific translational and/or rotational positions of the image capture device 302 and/or based on changes in translational and/or rotational positions of the image capture device 302 as a function of progress through the capture duration. That is, the position information may characterize translational and/or rotational positions of the image capture device 302 and/or changes in translational and/or rotational positions (motion) of the image capture device 302 (e.g., direction, amount, velocity, acceleration) during the capture duration. The position information may include rotational position information characterizing rotational position of the image capture device 302, translational position information characterizing translational position of the image capture device 302, and/or other position information. In some implementations, the position information may characterize translational and/or rotational positions of the image capture device 302 by characterizing changes in translational and/or rotational positions (motion) of the image capture device 302 during the capture duration, and vice versa.

In some implementations, the position information may include data from the position sensor (e.g., gyroscope data, accelerometer data) with time stamps per visual content capture at different moments. For example, the position information may include gyroscope data and/or accelerometer data per individual video frames captured by the image capture device. In some implementations, calibration of an inertial measurement unit may be used to combine different data within the position information.

The image capture device 302 may experience motion during the capture duration. Motion of the image capture device 302 may include the image capture device experiencing different positions (e.g., translational positions, rotational positions) during the capture duration. That is, the image capture device 302 may capture visual content while changing positions during the capture duration. The image capture device 302 may experience positions (e.g., translational positions, rotational positions) as a function of progress through the capture duration. Different positions of the image capture device 302 at which the visual content is captured may correspond to different moments within the progress length of the visual content.

Motion of the image capture device 302 during visual content capture may result in motion within the visual content. For example, shaking of the image capture device 302 during visual content capture may result in shaky motion within the captured visual content. Such motion within the visual content may be unintentional and/or not be desirable. Stabilization of visual content may include reduction/removal of motion present in the visual content due to motion (e.g., mechanical displacement, rotational motion, translational motion) of the image capture device 302 during visual content capture.

In some implementations, the visual content may be stabilized via one or more punchouts of the visual content and/or other information. Such stabilization of visual content may include using smaller spatial extents of the visual content to provide a punchout view of the visual content that creates a more stable view than when viewing the entirety of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. A punchout of the visual content may include extents of the visual content within one or more viewing windows. The extents of the visual content viewable/extracted within the viewing window may be used to provide views of different spatial extents of the visual content.

For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length/capture duration of the visual content. A viewing window may correspond to the entire duration of the progress length/capture duration or for one or more portions (e.g., portions including moments of interest) of the progress length/capture duration. The punchout of the visual content may be presented on one or more displays, included in one or more videos, and/or otherwise used to stabilize the visual content.

Stabilization of visual content may be performed based on placement of the viewing window within the field of view of the visual content. The placement of the viewing window may compensate for the positions/motion of the image capture device during the capture duration. For example, a viewing window having a smaller size than the field of view of the visual content may be used to provide a punchout of the visual content. The punchout (cropped view) may be moved within the field of view to provide a stabilized view of the visual content. The punchout may be moved within the field of view based on movement of the punchout (e.g., moving the viewing window within fixed visual content) and/or movement of the visual content (e.g., moving visual content with respect to fixed viewing window).

The viewing window may be oriented with respect to the field of view of the visual content to provide a punchout of the visual content that is stable with respect to prior and/or next punchout of the visual content. For example, the viewing window may be oriented with respect to the field of view of images/video frames captured by the image capture device to provide a punchout of the images/video frames such that the presented content appears to have been captured with a stable/more stable image capture device (e.g., a punchout of a video frame being stable/more stable with a punchout of the preceding video frame and/or a subsequent video frame).

Figure 4:
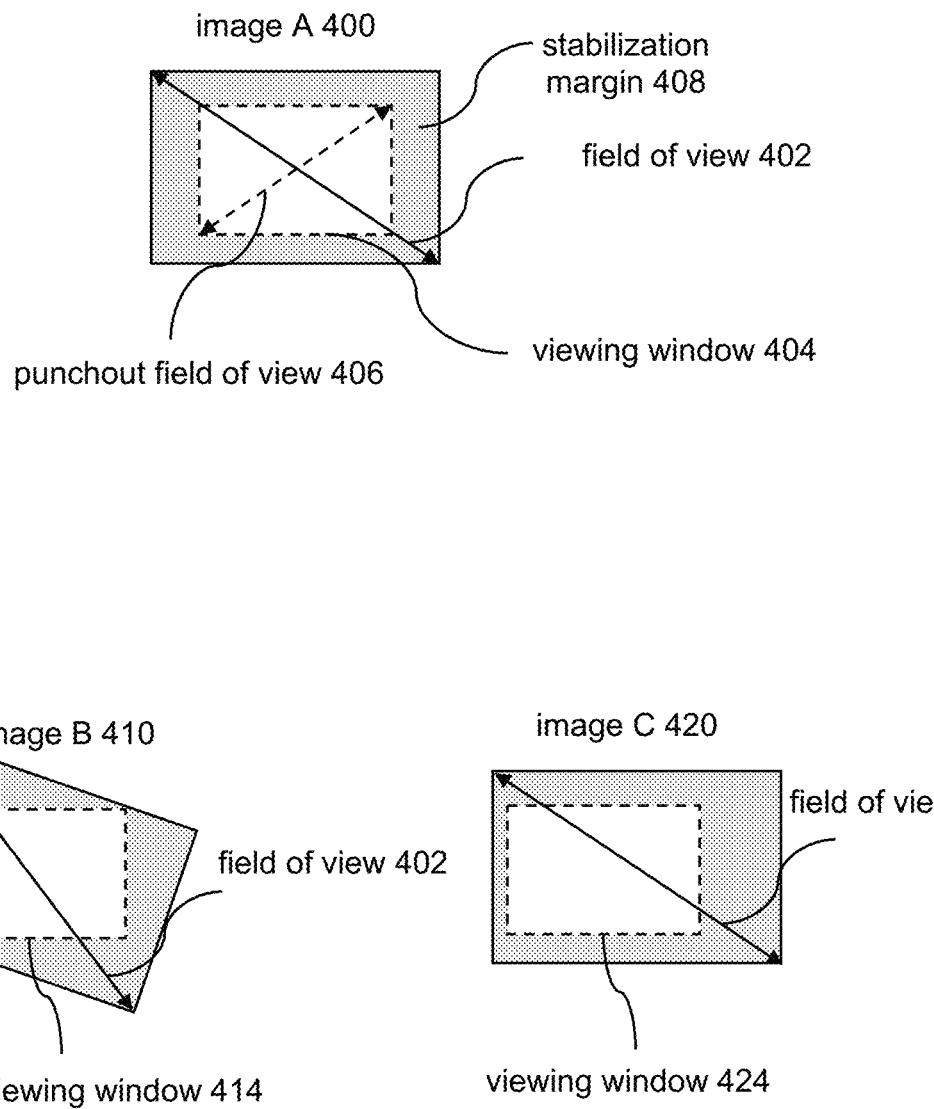
FIG. 4 illustrates example orientations of viewing with respect to images.

For example, FIG. 4 illustrates example orientations of viewing windows 404, 414, 424 with respect to images 400, 410, 420. The images 400, 410, 420 may have a field of view 402. The viewing windows 404, 414, 424 may have a punchout field of view 406. The images 400, 410, 420 may include capture of a scene within an angle defined by the field of view 402. The viewing windows 404, 414, 424 may provide a punchout of the images 400, 410, 420 to be used for video stabilization. The punchout field of view 406 of the viewing windows 404, 414, 424 may be smaller than the field of view 402 of the images 400, 410, 420. The difference between the field of view 402 and the punchout field of view 406 may define a stabilization margin 408 within which the viewing window 404 may move with respect to the image A 400/field of view 402. The stabilization margin 408 may specify how much the viewing window 404 may move while remaining inside the field of view 402 of the visual content included within the image A 402 (e.g., crop constraint).

The viewing window 404, 414, 424 may be placed within the field of view 402 to perform stabilization. For example, the viewing window 414 may be rotated with respect to the field of view 402 of the image B 410 while not going beyond the pixels captured within the image B 410. The viewing window 424 may be laterally moved with respect to the field of view 402 of the image C 420 while not going beyond the pixels captured within the image C 420. The placements of the viewing window 404, 414, 424 may be determined based on the positions/motions of the image capture device when the images 400, 410, 420 were captured to stabilize the visual content.

For instance, the viewing window 414 may be oriented with respect to the field of view 402 of the image B 410 to provide a punchout of the image B 410 that is stable with respect to a prior and/or next punchout of the images (e.g., stable with the punchout of the image A 400 using the viewing window 404 for the image A 400). Similarly, the viewing window 424 may be oriented with respect to the field of view 402 of the image C 420 to provide a punchout of the image C 420 that is stable with respect to a prior and/or next punchout of the images (e.g., stable with the punchout of the image B 410 using the viewing window 414 for the image B 410).

In some implementations, placement of the viewing window within the field of view of the visual content may be determined based on positions (e.g., rotational positions, translational positions) of the image capture device during the capture duration, stabilization applied to the visual content, and/or other information. The punchout of the visual content may include one or more spatial extents of the visual content as a function of progress through the progress length of the visual content to compensate for different positions (translational positions and/or rotational positions) of the image capture device during the corresponding moments within the capture duration. Different stabilization applied to the visual content may result in different placements of the viewing window (e.g., different crop motion) being determined to compensate for the positions of the image capture device during the capture duration.

For example, one or more portions of the visual content captured from light within the field of view 305 may be presented on a display and/or used to present/generate stabilized visual content. The portions of the visual content presented on the display/used to generate a video may include those portions of the visual content within a viewing window. A viewing window may define extents of the visual content (e.g., of image(s)/video frame(s)) to be included within a punchout. The viewing window may be determined so that the visual content within the presentation/generated video does not include or includes less motion than the visual content. The field of view 305 may be larger than a size of the punchout/viewing window used to generate stabilized visual content.

For instance, the visual content may include shaky/jerky footage due to motion of the image capture device 302 during visual content capture, and the viewing window may be determined so that the portion of the visual content that is presented/used for video generation does not appear shaky/jerky or appears less shaky/jerky. That is, a punchout/viewing window may be used to stabilize visual content captured by the image capture device 302. For example, the shape, size, and/or the location of the viewing window within the field of view of the visual content may be determined to compensate for motion of the image capture device 302 during capture such that the video appears to have been captured from an image capture device 302 with less motion. The visual content captured by the image capture device 302 may be cropped to generate stabilized visual content.

A viewing window may define one or more extents of the visual content. A viewing window may define extents of the visual content to be included within stabilized visual content as the function of progress through the progress length of the visual content. A viewing window may define which portions of the visual content are included within the stabilized visual content at different moment within the progress length. Inclusion of the extents of the visual content defined by the viewing window within the stabilized visual content may effectuate stabilization of the visual content. For example, a viewing window may define which spatial portions of the visual content captured by the image capture device during the capture duration is presented on a display and/or included within stabilized visual content. Stabilized visual content may be generated as outputs of portions of the visual content captured by the image capture device, with the outputted portions including extent(s) of the visual content within the punchout/viewing window. Inclusion of the extent(s) of the visual content within the punchout/viewing window may effectuate stabilization of the visual content via selective cropping.

A viewing window may be located within the field of view of the visual content. Placement of the viewing window within the field of view of the visual content may be determined based on positions (e.g., rational positions, translational positions, changes in positions) of the image capture device during the capture duration, stabilization (stabilization technique) applied to the visual content, and/or other information. For example, the placement of the viewing window within the field of view of the visual content may change as a function of progress through the progress length of the visual content based on rotational positions of the image capture device, changes in rotational positions (motion) of the image capture device at different moments within the capture duration (as a function of progress through the capture duration), and/or particular stabilization technique (e.g., stabilization algorithm) applied to compensate for the rotational positions/motions of the image capture device. A viewing window may be characterized by viewing directions, viewing sizes (e.g., viewing zoom, viewing magnification), viewing rotations, and/or other information. Determining the placement of the viewing window may include determining one or more of viewing directions, viewing sizes, viewing rotations, and/or other characteristics of the viewing window.

A viewing direction may define a direction of view for visual content. A viewing direction may define the angle/visual portion of the visual content at which the viewing window may be directed. Changes in the viewing direction as the function of progress through the progress length may effectuate movement (e.g., panning) of the viewing window within the field of view of the visual content. For example, a viewing direction may be defined based on rotation about an axis that defines lateral movement of the viewing window (e.g., yaw), rotation about an axis that defines vertical movement of the viewing window (e.g., pitch), and/or rotation about other axes. The yaw and pitch values of the viewing direction may determine the location of the viewing window within captured images/video frames.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing size may define different aspect ratios of the viewing window (e.g., 4:3 aspect ratio, 16:9 aspect ratio, 1:1 aspect ratio).

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content.

In some implementations, the visual content may be stabilized via one or more modifications of the visual content and/or other information. Such stabilization of the visual content may include changes to the visual content itself (and/or creating a modified version/copy of the visual content) to provide stabilized visual content that is more stable than the original visual content. Modification of the visual content may include one or more changes to visual characteristics of the visual content, such as one or more changes in pixel locations and/or pixel intensities. Modification of the visual content may include one or more of rotation of the visual content, warping of the visual content, and/or other modification of the visual content. Rotation of the visual content may include change in how the visual content is oriented. The visual content may be rotated to compensate for different rotational positions of the image capture device during the capture duration. Warping of the visual content may include visual manipulation of one or more portions of the visual content. Visual content may be warped to compensate for different perspectives captured within the visual content due to motion of the image capture device during the capture duration. Visual content may be warped to provide rolling shutter compensation.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

Referring back to FIG. 1, the processor 11 (or one or more components of the processor 11) may be configured to obtain information to facilitate dynamic stabilization adjustment. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

The visual information component 102 may be configured to obtain visual information and/or other information. Obtaining visual information may include one or more of accessing, acquiring, analyzing, determining, examining, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor, a hardware component of an image capture device) and/or one or more software components (e.g., software running on a computing device).

Visual information may be obtained during acquisition of the visual content and/or after acquisition of the visual content by one or more image capture devices. For example, the visual information component 102 may obtain visual information defining visual content while the visual content is being captured by an image capture device. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., video/image editing application, video player/image viewer application), and/or other information. For example, a user interface/application may provide option(s) for a user to select visual content to be stabilized and/or visual content for which dynamic stabilization adjustment is to be performed. The visual information defining the visual content may be obtained based on the user's selection of the visual content through the user interface/application. Other selections of visual content for retrieval of visual information are contemplated.

The visual information may define visual content of a video. The visual content may be captured by an image capture device during a capture duration. The visual content may have a field of view (e.g., wide field of view, spherical field of view). The video may have a progress length. The visual content may be defined by the visual information as a function of progress through the progress length. For example, the visual information may define visual content of video frames of the video, with the video frames being associated with different moments within the progress length of the video. The progress length of the video may correspond to the capture duration for the video. The progress length of the video may be determined based on the capture duration. The progress length of the video may be same as the capture duration, shorter than the capture duration (e.g., playback rate of the video is faster than the capture rate of the video), and/or longer than the capture duration (e.g., playback rate of the video is slower than the capture rate of the video).

The visual content may include motion due to motion of the image capture device during the capture duration. The image capture device may experience positions (e.g., translational positions, rotational positions) as a function of progress through the capture duration. Different positions of the image capture device during the capture duration may result in motion within the visual content.

The context component 104 may be configured to assess context of the capture of the visual content by the image capture device. Assessing the context of the capture of the visual content by the image capture device may include one or more of analyzing, calculating, determining, estimating, evaluating, examining, identifying, retrieving, reviewing, and/or otherwise assessing the context of the capture of the visual content by the image capture device. Assessing the context of the capture of the visual content by the image capture device may include qualitative and/or quantitative assessment of the context of the capture of the visual content by the image capture device. For example, the context component 104 may evaluate, determine, and/or estimate the nature of, quality of, and/or quantity reflecting the context of the capture of the visual content by the image capture device.

Context of the capture of the visual content by the image capture device may be assessed based on one or more of visual content analysis, audio content analysis, position/motion analysis, user input analysis, metadata analysis, and/or other information. Visual content analysis may refer to examination of the visual content, such as blur detection, color analysis, face recognition, histogram analysis, object recognition, background recognition, motion recognition, skeletal/pose estimation, activity recognition, scene recognition, salience detection, emotion recognition, and/or other visual content analysis. Audio content analysis may refer to examination of the audio content, such as voice recognition, command recognition, activity recognition, emotion detection, and/or other audio content analysis. Position/motion analysis may refer to examination of position/motion experienced by the image capture device during capture of the visual content, such as by analyzing position information. User input analysis may refer to examination of inputs provided by one or more users, such as user's quantitative and/or qualitative designation of the context of the capture of the visual content by the image capture device (e.g., user classifying the context, user providing vales of parameters for classifying the context) and/or other user input analysis. Metadata analysis may include examination of metadata relating to the image capture device during capture of the video content, such as telemetry information, location (GPS) information, position information, speed information, velocity information, acceleration information, rotation information, and/or other information. Other assessment of the context of the capture of the visual content by the image capture device are contemplated.

The context of the capture of the visual content by the image capture device may be assessed as a function of progress through the capture duration for the visual content. Assessing the context of the capture of the visual content by the image capture device as a function of progress through the capture duration may include assessing the context of the capture of the visual content by the image capture device as a function of the progress length of the video. The context component 104 may assess context of the capture of the visual content by the image capture device at different moments (points in time, time durations) within the capturing duration.

The context of the capture of the visual content by the image capture device may refer to circumstances and/or conditions under which the visual content is captured by the image capture device. The context of the capture of the visual content by the image capture device may refer to circumstances and/or conditions of the image capture device, such as how the image capture device is being operated and/or moved. The context of the capture of the visual content by the image capture device may refer to circumstances and/or conditions apart/external from to the image capture device, such as circumstances and/or conditions of one or more scenes that are captured within the visual content.

In some implementations, the context of the capture of the visual content by the image capture device may include motion of the image capture device. The motion of the image capture device may include motion of the image capture device at a point in time, over a duration of time, at a location, and/or over a range of locations. Motion of the image capture device may include translational motion and/or rotational motion of the image capture device. For example, motion of the image capture device may include one or more of translational speed, rotational speed, translational velocity, rotational velocity, translational acceleration, rotational acceleration, translational direction, and/or rotational direction of the image capture device during capture of the visual content. In some implementations, motion of the image capture device may include a direction of gravity on the image capture device during visual content capture. The direction of gravity may indicate the motion of the image capture device with respect to gravity during capture of the visual content (e.g., motion away from direction of gravity, motion towards direction of gravity, motion perpendicular to the direction of gravity). For instance, motion of the image capture device may include the image capture device being thrown during capture of the visual content. Other motion of image capture device are contemplated.

In some implementations, the context of the capture of the visual content by the image capture device may include motion of the visual content. Motion of the visual content may include motion of one or more things (e.g., living things, non-living things, persons, animal, objects, vehicles, machines) depicted/captured within the visual content. The motion of the visual content may include motion of thing(s) a point in time, over a duration of time, at a location, and/or over a range of locations. The motion of the visual content may include translational motion and/or rotational motion of the thing(s) depicted/captured within the visual content. For example, motion of the visual content may include one or more of translational speed, rotational speed, translational velocity, rotational velocity, translational acceleration, rotational acceleration, translational direction, and/or rotational direction of the thing(s) depicted/captured within the visual content. In some implementations, motion of the visual content may include a direction of gravity on the image capture device during visual content capture. The direction of gravity may indicate the motion of the thing(s) with respect to gravity during capture of the visual content (e.g., motion away from direction of gravity, motion towards direction of gravity, motion perpendicular to the direction of gravity). For instance, motion of the visual content may include a thing jumping or being thrown during capture of the visual content. Other motion of visual content are contemplated.

In some implementations, the context of the capture of the visual content by the image capture device may include a motion type of the image capture device. A motion type of the image capture device may refer to a category and/or a quality of the motion of the image capture device. The motion type of the image capture device may be assessed based on one or more of user input indicating the motion type, visual content analysis, audio content analysis, motion analysis, and/or other information. For example, values of acceleration, rotation, and/or speed of the image capture device (outputted by the position sensor) may be used to determine the type of motion (e.g., static, walking, jogging, running, sliding, bouncing, riding, racing, panning) being applied to and/or experienced by the image capture device during capture duration. For instance, position information may be processed using one or more classifiers (e.g., support vector machine, random forest, k-nearest neighbor, multi-player perceptron, neural network) to determine the motion type of the image capture device. In some implementations, the motion type of the image capture device may include a type of activity (e.g., type of sporting activity) being engaged with the image capture device.

In some implementations, the context of the capture of the visual content by the image capture device may include a mounting type of the image capture device. A mounting type of the image capture device may refer to a type of mount used to secure/fix the image capture device (e.g., to a person, to an object, to a vehicle). A mounting type of the image capture device may refer to how the image capture device is being carried by a person or a thing. For example, with respect to a person, a mounting type of the image capture device may include how the image capture device is being carried by the person (e.g., held in held, mounted on helmet, carried on backpack). In some implementations, the context of the capture of the visual content by the image capture device may include combination of context, such as combination of the motion type of the image capture device and the mounting type of the image capture device. Other combinations of context are contemplated.

In some implementations, the context of the capture of the visual content by the image capture device may include an environment of the image capture device. The environment of the image capture device may refer to the surroundings and/or the conditions under which the image capture device captures visual content. The environment of the image capture device may refer to a type of setting/geographical location in which the visual content captured and/or the environmental conditions that affect capture of visual content. For example, assessing the environment of the image capture device may include assessing one or more of exposure, white balance, scene classification (e.g., beach, desert, forest, mountain, snow), lighting condition (e.g., low light), and/or other environment of the image capture device.

The stabilization parameter component 106 may be configured to determine one or more values of one or more stabilization parameters for the visual content. The value(s) of the stabilization parameter(s) may be determined as the function of progress through the capture duration based on the context of the capture of the visual content by the image capture device and/or other information. A stabilization parameter may refer to a factor that defines stabilization of visual content. A stabilization parameter may refer to a factor that defines how stabilization of visual content is performed. A value of a stabilization parameter may include a numerical value, a binary value (e.g., yes vs no, true vs false), alphabetical value, and/or other measurable/quantifiable value.

In some implementations, determination of the value(s) of the stabilization parameter(s) for the visual content as the function of progress through the capture duration based on the context of the capture of the visual content by the image capture device may include determination of different values of the stabilization parameter(s) for different context of the capture of the visual content by the image capture device. That is, the stabilization parameter component 106 may determine different value(s) of the stabilization parameter(s) based on different context of the capture of the visual content by the image capture device. The value(s) of the stabilization parameter(s) may be determined to account for changes in context of the capture of the visual content by the image capture device through the capture duration. For instance, the context of the capture of the visual content by the image capture device may change halfway through the capture duration. The stabilization parameter component 106 may determine one set of values of the stabilization parameter(s) for the first half of the capture duration and another set of values of the stabilization parameter(s) for the other half of the capture duration.

In some implementations, different value(s) of stabilization parameter(s) may be associated with and/or correspond to different context of capture of the visual content by the image capture device. The value(s) of the stabilization parameter(s) may be associated with and/or correspond to different context of capture of the visual content by the image capture device based on human decision (e.g., human designed value(s) of stabilization parameter(s) for different context), based on machine-learning technique (e.g., machine-leering discovery of value(s) of stabilization parameter(s) for different context based on analysis of stabilized visual content), and/or other information.

Determining the value(s) of stabilization parameter(s) based on the context of the capture of the visual content by the image capture device may enable and/or accomplish dynamic stabilization adjustment. Dynamic stabilization adjustment may include dynamic changes in how the visual content are stabilized to account for context in which the visual content are captured. Rather than stabilizing visual content using fixed value(s) of stabilization parameter(s), the value(s) of the stabilization parameters may be set/adjusted based on the context of visual content capture. That is, tuning of the stabilization may be set/adjusted based on the context of visual content capture.

For instance, for certain types of motion, it may be desirable to stabilize visual content to produce gimbal-like visual content with no motion. For other types of motion, it may be desirable to stabilize visual content that flows from frame to frame using small motion. For example, using a fixed-viewpoint stabilization for sporting activity may result in the punchout/viewing window hitting/crossing the edge of the visual content field of view, which may result in rapid/jerky change in placement of the punchout/viewing window to move the punchout/viewing window away from the edge of the field of view. For sporting activity, it may be desirable to use a flowing motion stabilization that keeps the punchout/viewing window moving to keep the punchout/viewing window from the edge of the field of view. For blogging-type motion, using a flowing motion stabilization may result in the subject of the visual content (e.g., speaker) constantly moving within the stabilized visual content, which may be distracting. For blogging activity, it may be desirable to use the fixed-viewpoint stabilization because the likelihood of the punchout/viewing window hitting/crossing the edge of the field of view is low.

In some implementations, a stabilization parameter may correspond to a particular stabilization technique and determining a value of the stabilization parameter may include determining whether and/or to what extent the stabilization technique is used to stabilize the visual content. The stabilization parameter component 106 may determine which stabilization technique(s) and/or to what extent stabilization technique(s) are to be used to stabilize the visual content based on the context of the capture of the visual content by the image capture device. A stabilization technique may refer to one or more ways and/or methods for performing stabilization of visual content. A stabilization technique may stabilize visual content via use of one or more viewing windows/punchouts, modifications of the visual content (e.g., rotations, warping), and/or other ways/methods. Different stabilization techniques may stabilize visual content differently. Use of different stabilization techniques based on context of visual content capture may result in differently stabilized visual content for differently captured visual content.

In some implementations, a stabilization parameter may correspond to one or more aspects of a stabilization technique and determining a value of the stabilization parameter may include determining whether and/or to what extent the aspect(s) of the stabilization technique are used to stabilize the visual content. The stabilization parameter component 106 may determine which aspect(s) of the stabilization technique and/or to what extent different aspects of the stabilization technique are to be used to stabilize the visual content based on the context of the capture of the visual content by the image capture device. For example, a stabilization technique may be defined and/or controlled by one or more stabilization parameters. A stabilization parameter may refer to a condition and/or a factor that defines and/or sets the conditions for stabilizing the visual content. A change in a stabilization parameter may entirely change the stabilization of the visual content and/or change one or more portions of the stabilization of the visual content.

For example, a stabilization parameter may include condition(s) and/or factor(s) that define how the punchout of the visual content is determined (e.g., placed, designed), how the visual content within the punchout is modified, and/or how the stabilized visual content is generated. For example, value(s) of one or more stabilization parameters may be set to determine the size, the shape, and/or other characteristics of the punchout/viewing window. For instance, a value of a stabilization parameter correspond to the size of the punchout/viewing window, and different values of the stabilization parameter may be used for different visual content capture context to decrease/increase the amount stabilization margin. A value of a stabilization parameter may correspond to the shape of the punchout/viewing window, and different values of the stabilization parameter may be used for different visual content capture context to use different shapes of the punchout/viewing window (e.g., linear vs wide field of view punchout) in performing stabilization. As another example, value(s) of one or more stabilization parameters may be set to determine the field of view of the visual content. For instance, a value of a stabilization parameter correspond to the size of field of view to be used in capturing visual content, and different values of the stabilization parameter may be used for different visual content capture context to decrease/increase the field of view of the visual content that is captured.

In some implementations, the visual content may be stabilized based on a punchout of one or more extents of the visual content. The punchout may be placed within the field of view of the visual content. The placement of the punchout within the field of view (orientation of the punchout with respect to the field of view, frame-to-frame movement of the punchout) may determine which portions of the visual content are extracted/used to stabilize the visual content (e.g., generated stabilized visual content). In some implementations, the stabilization parameter(s) may impact the placement of the punchout within the field of view of the visual content and/or processing of the visual content within the punchout for visual content stabilization.

For example, the stabilization parameter(s) may include one or more of a motion blur parameter, a horizon leveling parameter, margin-distortion parameter, a stickiness parameter, a weight balance parameter, and/or other stabilization parameters.

The motion blur parameter may control an extent to which motion blur is taken into account for stabilization. Motion of the image capture device may be categorized into inter-frame motion and intra-frame motion. Inter-frame motion may refer to motion between frame exposure periods. Inter-frame motion may be attenuated based on the margin constraint. Intra-frame motion may refer to motion of the image capture device during an exposure period of individual video frames. The motion may be encrusted in the video frames through the motion blur, and attenuation of the intra-frame motion may result in motion blur pulsations that create poor visual impression.

The value(s) of the motion blur parameter may range between value(s) corresponding to no motion blur compensation and value(s) corresponding to full motion blur compensation. For example, value of 0 for the motion blur parameter may result in motion being fully attenuated and image capture device motion during the exposure periods not impacting stabilization. Value of 1 for the motion blur parameter may result image capture device motion during the exposure periods being preserved for stabilization. Other values of the motion blur parameter are contemplated.

In some implementations, information on high frequencies (jitters) of image capture device may be used to improve visual characteristics of stabilized visual content. Certain portion of high frequencies in the input may be kept based on the image capture configuration, such as exposure start time and exposure duration time, the position information (e.g., position sensor readings), and/or other information. For example, motion of the image capture device/image sensor during a frame exposure may be analyzed and used to generate/modify a capture trajectory that minimizes inter-frame motion (e.g., smooths inter-frame motion) while preserving the intra-frame motion, which may contain the high frequencies. This may provide for improved visual characteristics of the stabilized visual content, such as by compensating for motion blur and/or lowlight image capture conditions.

For example, image capture may not happen instantaneously. Rather, it may take a certain amount of time for image sensor pixel sites to gather light. This may lead to splitting of the image sensor motion in time in two phases: inter-frame motion which may not be captured and may be suppressed, and intra-frame motion which may be "encrusted" in the image and may not be removed. Better visual characteristics (e.g., impression) may be provided when the intra-frame motion is taken into account. That the punchout/viewing window move/follows in the same direction and with the same speed as during the frame exposure phase, so that its motion is aligned with the motion blur in the visual content.

The horizon leveling parameter may control an extent to which visual content is rotated and/or warped to level the visual content with respect to horizon. Horizon leveling of visual content may refer to modifying or punching out a portion of the visual content to depict a leveled scene. Horizon leveling of visual content may refer to modifying or punching out a portion of the visual content so that the scene depicted within the visual content is leveled with respect to ground, sea, earth, and/or the horizon. Horizon leveling of visual content may refer to modifying or punching out a portion of the visual content so that the depicted scene appears to have been captured by an upright image capture device (non-tilted image capture device).

The value(s) of the horizon leveling parameter may range between value(s) corresponding to no horizon leveling and value(s) corresponding to full horizon leveling. For example, value of 0 for the horizon leveling parameter may result in no horizon leveling being performed (e.g., visual content, punchout/viewing window not being rotated to account for non-horizontal capture of visual content). Value of 1 for the horizon leveling parameter may result maximum horizon leveling being performed. Other values of the horizon leveling parameter are contemplated.

The margin-distortion parameter may control an amount of margin and/or distortion used to capture and/or stabilize the visual content. The value(s) of the margin-distortion parameter may determine the amount of stabilization margin between the field of view of the visual content and the punchout/viewing window. The value(s) of the margin-distortion parameter may determine the type of distortion/projection used to arrange the visual content (e.g., linear field of view distortion/projection vs wide field of view distortion/projection).

The value(s) of the margin-distortion parameter may range between value(s) corresponding to one margin/distortion and another margin/distortion. For example, value of 0 for the margin-distortion parameter may result in smallest margin/particular distortion being used. Value of 1 for the margin-distortion parameter may result largest margin/different distortion being used. Other values of the margin-distortion parameter are contemplated.

The stickiness parameter may control an extent to which placement of the punchout within the field of view of the visual content follows motion of the image capture device. The stickiness parameter may control the extent by which preceding placement of the punchout impacts current placement of the punchout. The value(s) of the stickiness parameter may determine the extent to which the punchout remains close the to center of the field of view of the visual content.

The value(s) of the stickiness parameter may range between value(s) corresponding to no displacement of the punchout and value(s) corresponding to full displacement of the punchout. For example, value of 0 for the stickiness parameter may result in the punchout remaining at the center of the field of view of the visual content and/or not moving from the prior placement of the punchout within the field of view (placement of the punchout within the prior frame). Value of 1 for the stickiness parameter may result in the punchout being able to move fully away from the center of the field of view of the visual content and/or the prior placement of the punchout within the field of view. Other values of the stickiness parameter are contemplated.

Figure 5A:
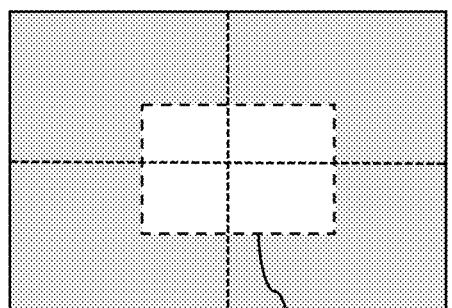
FIGS. 5A and 5B illustrates example displacement of viewing windows from center of images.
Figure 5B:
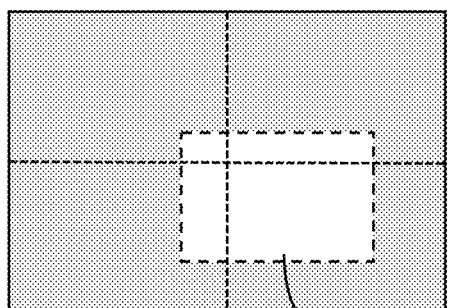

FIGS. 5A and 5B illustrates example displacement of viewing windows from center of images. In FIG. 5A, a viewing window 504 may be allowed to move from the center of an image 500 by a small amount. In FIG. 5B, a viewing window 514 may be allowed to move from the center of an image 510 by a large amount. The amount of displacement allowed may be controlled by the value(s) of the stickiness parameter.

The weight balance parameter may control an extent to which placement of the punchout within the field of view of the visual content compensates for different types of motion of the image capture device. For example, the weight balance parameter may control an extent to which placement of the punchout within the field of view of the visual content compensates for rotational velocity and/or rotational acceleration of the image capture device. For instance, the weight balance parameter may control to what extent a combination of rotational velocity and rotational acceleration is minimized when determining placement of the punchout.

The value(s) of the weight balance parameter may range between value(s) corresponding to minimization of different types of motion. For example, value of 0 for the weight balance parameter may result in minimization of angular velocity in stabilizing visual content. Value of 1 for the weight balance parameter may result in minimization of angular acceleration in stabilizing visual content. Value between 0 and 1 may result in minimization of both angular velocity and angular acceleration, with minimization of different types of motion weighted according to the value. Other values of the weight balance parameter are contemplated.

Sole minimization of angular velocity may result in fixed-viewpoint stabilization. Sole minimization of angular velocity may result in punchout for stabilization that prefers to keep a steady position when possible and may result in sharp-movements when the punchout hits/crosses the edge of the visual content field of view. Sole minimization of angular velocity may minimize apparent motion between video frames, but the resulting motion may appear unnatural.

Sole minimization of angular acceleration may result in flowing motion stabilization. Sole minimization of angular acceleration may result in punchout for stabilization that reduces/minimizes sharp movements of the punchout. Sole minimization of angular acceleration may result a constant velocity and may produce more motion than sole minimization of angular velocity. Minimization of a combination of angular velocity and angular acceleration may provide for a stabilization between the fixed-viewpoint stabilization and flowing motion stabilization (with different minimization weighted according to the value of the weight-balance parameter).

Figure 6A:
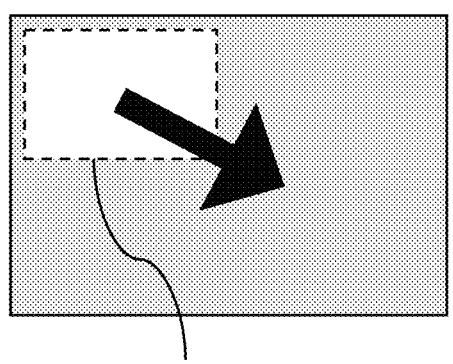
FIGS. 6A and 6B illustrates example movement of the viewing window within images.
Figure 6B:
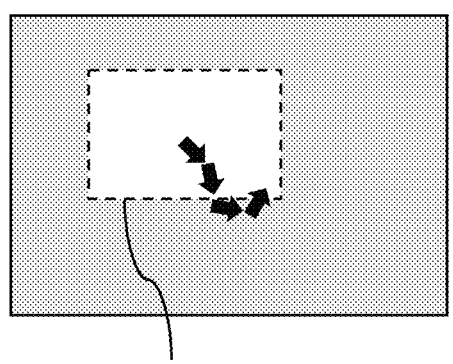

FIGS. 6A and 6B illustrates example movement of the viewing window within images. In FIG. 6A, the placement of a viewing window 604 within an image 600 may be determined in accordance with a fixed-viewpoint stabilization. The viewing window 604 may be placed to keep the same portion of the scene depicted within the punchout as the preceding and/or the following frame. The fixed-viewpoint stabilization may result in the viewing window 604 hitting/crossing the edge of the image 600, which may cause the viewing window 604 to sharply move away from the edge (e.g., towards the center of the image 600).

In FIG. 6B, the placement of a viewing window 614 within an image 610 may be determined in accordance with a flowing motion stabilization. The viewing window 614 may move moved more frequently/consistently than the viewing window 604. The extent of movement of the viewing window 614 within the field of view may be smaller than the extent of moving of the viewing window 604. The frequent/consistent movement of the viewing window 614 may keep the viewing window 614 away from the edge of the image 610.

The stabilization component 108 may be configured to effectuate stabilization of the visual content. Effectuating stabilization of the visual content may include causing, bringing about, putting into effect/operation, and/or otherwise effectuating stabilization of the visual content. The stabilization of the visual content may be effectuated as the function of progress through the capture duration based on the value(s) of the stabilization parameter(s) and/or other information. The value(s) of the stabilization parameter(s) determined as the function of progress through the capture duration may be used to stabilize the visual content as the function of progress through the capture duration. For example, the stabilization parameter component 106 may determine different value(s) of stabilization parameter(s) for different moments in the capture duration, and the visual content captured at the different moments in the capture duration may be stabilized using/in accordance with the corresponding value(s) of stabilization parameter(s).

Changes in the stabilization parameter(s) may result in changes to how the visual content is stabilized. For example, the visual content may be stabilized based on a punchout of one or more extents of the visual content, with the punchout placed within the field of view of the visual content. The punchout may be placed within the field of view of the visual content for visual content stabilization based on the value(s)

of stabilization parameter(s). Changes in the stabilization parameter(s) for visual content captured at different moments in the capture duration (due to change in capture context) may result in different placement of the punchout within the field of view of the visual content. Other changes in stabilization of the visual content are contemplated.

In some implementations, the visual content may not be stabilized in/near real time. For example, the image capture device may not have sufficient resource to stabilize the visual content in real-time and/or may be devoting its resources to other tasks. The stabilization of the visual content may be performed by the image capture device once sufficient resource becomes available. In some implementations, the stabilization of the visual content may be performed by one or more remote processors. For example, the remote processor(s) may be one or more processors of a remote computing device (e.g., mobile device, desktop, server), and the remote processor may receive visual content captured by the image capture device. The remote computing device (software running on the remote computing device) may apply the stabilization of the visual content captured by the image capture device. The post-capture stabilization of the visual content may be performed by the remote processor responsive to reception of the visual content (e.g., reception of video information), responsive to user/system command to stabilize the visual content, responsive to the visual content being opened for playback, and/or responsive to other conditions.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
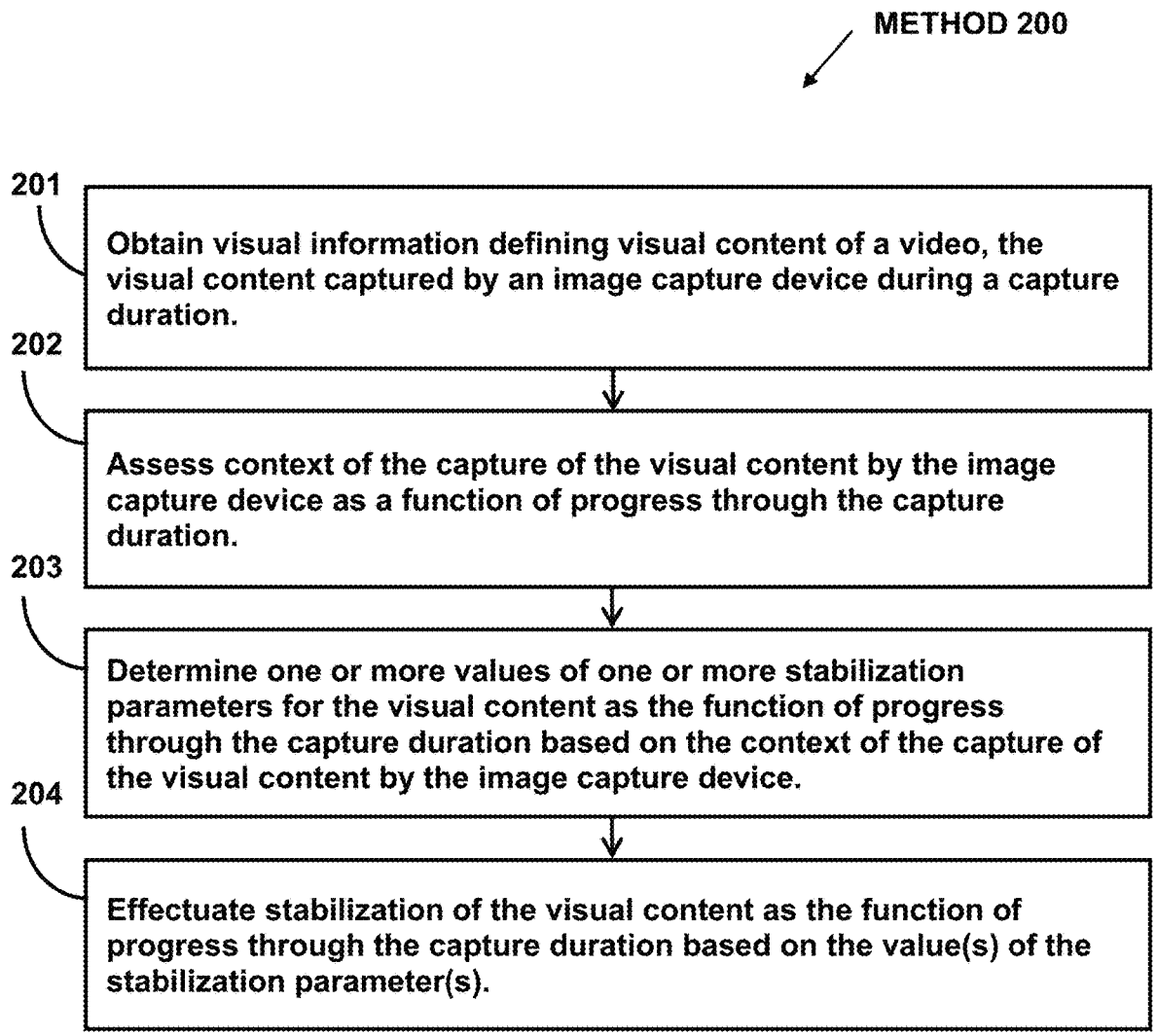
FIG. 2 illustrates an example method for dynamic stabilization adjustment.

FIG. 2 illustrates method 200 for dynamic stabilization adjustment. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information may be obtained. The visual information may define visual content of a video. The visual content may be captured by an image capture device during a capture duration. The visual content may have a field of view. In some implementation, operation 201 may be performed by a processor component the same as or similar to the visual information component 102 (Shown in FIG. 1 and described herein).

At operation 202, context of the capture of the visual content by the image capture device may be assessed as a function of progress through the capture duration. In some implementation, operation 202 may be performed by a processor component the same as or similar to the context component 104 (Shown in FIG. 1 and described herein).

At operation 203, one or more values of one or more stabilization parameters for the visual content may be determined as the function of progress through the capture duration based on the context of the capture of the visual content by the image capture device and/or other information. In some implementation, operation 203 may be performed by a processor component the same as or similar to the stabilization parameter component 106 (Shown in FIG. 1 and described herein).

At operation 204, stabilization of the visual content as the function of progress through the capture duration may be effectuated based on the value(s) of the stabilization parameter(s). In some implementation, operation 204 may be performed by a processor component the same as or similar to the stabilization component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for dynamic stabilization adjustment, the system comprising:
one or more physical processors configured by machine-readable instructions to:
obtain visual information defining visual content of a video, the visual content captured by an image capture device during a capture duration, the visual content having a field of view;
assess context of the capture of the visual content by the image capture device;
determine one or more stabilization parameter values for the visual content based on the context of the capture of the visual content by the image capture device, the one or more stabilization parameter values controlling placement of a viewing window within the field of view of the visual content for stabilization of the visual content, the viewing window defining an extent of the visual content to be included within a punchout of the visual content for the stabilization of the visual content, wherein the one or more stabilization parameter values include a weight balance parameter value, the weight balance parameter value controlling an extent to which the placement of the viewing window minimizes a combination of rotational velocity and rotational acceleration of the image capture device; and
effectuate the stabilization of the visual content based on the one or more stabilization parameter values.

2. The system of claim 1, wherein the context of the capture of the visual content by the image capture device includes a direction of gravity on the image capture device during the capture of the visual content by the image capture device.

3. The system of claim 1, wherein the context of the capture of the visual content by the image capture device includes a motion type or a mounting type of the image capture device.

4. The system of claim 1, wherein the one or more stabilization parameter values further include a horizon leveling parameter value, the horizon leveling parameter value controlling an extent to which the viewing window is rotated with respect to the field of view of the visual content to depict an upright scene within the stabilized visual content.

5. The system of claim 1, wherein the one or more stabilization parameter values further include a margin-distortion parameter value, the margin-distortion parameter value controlling an amount of stabilization margin between the field of view of the visual content and the viewing window.

6. The system of claim 1, wherein the one or more stabilization parameter values further include a margin-distortion parameter value, the margin-distortion parameter value controlling whether a linear field of view distortion or projection or a wide field of view distortion or projection is used to arrange the visual content based on the context of the capture of the visual content by the image capture device.

7. The system of claim 1, wherein the one or more stabilization parameter values further include a motion blur parameter value, the motion blur parameter value controlling an extent to which motion blur within the visual content is taken into account for the stabilization of the visual content.

8. The system of claim 1, wherein the one or more stabilization parameter values further include a stickiness parameter value, the stickiness parameter value controlling an extent to which the placement of the viewing window is allowed to deviate from a center of the field of view of the visual content based on the context of the capture of the visual content by the image capture device.

9. A method for dynamic stabilization adjustment, the method performed by a computing system including one or more processors, the method comprising:
    obtaining, by the computing system, visual information defining visual content of a video, the visual content captured by an image capture device during a capture duration, the visual content having a field of view;
    assessing, by the computing system, context of the capture of the visual content by the image capture device;
    determining, by the computing system, one or more stabilization parameter values for the visual content based on the context of the capture of the visual content by the image capture device, the one or more stabilization parameter values controlling placement of a viewing window within the field of view of the visual content for stabilization of the visual content, the viewing window defining an extent of the visual content to be included within a punchout of the visual content for the stabilization of the visual content, wherein the one or more stabilization parameter values include a weight balance parameter value, the weight balance parameter value controlling an extent to which the placement of the viewing window minimizes a combination of rotational velocity and rotational acceleration of the image capture device; and
    effectuating, by the computing system, the stabilization of the visual content based on the one or more stabilization parameter values.

10. The method of claim 9, wherein the context of the capture of the visual content by the image capture device includes a direction of gravity on the image capture device during the capture of the visual content by the image capture device.

11. The method of claim 9, wherein the context of the capture of the visual content by the image capture device includes a motion type or a mounting type of the image capture device.

12. The method of claim 9, wherein the one or more stabilization parameter values further include a horizon leveling parameter value, the horizon leveling parameter value controlling an extent to which the viewing window is rotated with respect to the field of view of the visual content to depict an upright scene within the stabilized visual content.

13. The method of claim 9, wherein the one or more stabilization parameter values further include a margin-distortion parameter value, the margin-distortion parameter value controlling an amount of stabilization margin between the field of view of the visual content and the viewing window.

14. The method of claim 9, wherein the one or more stabilization parameter values further include a margin-distortion parameter value, the margin-distortion parameter value controlling whether a linear field of view distortion or projection or a wide field of view distortion or projection is used to arrange the visual content based on the context of the capture of the visual content by the image capture device.

15. The method of claim 9, wherein the one or more stabilization parameter values further include a motion blur parameter value, the motion blur parameter value controlling an extent to which motion blur within the visual content is taken into account for the stabilization of the visual content.

16. The method of claim 9, wherein the one or more stabilization parameter values further include a stickiness parameter value, the stickiness parameter value controlling an extent to which the placement of the viewing window is allowed to deviate from a center of the field of view of the visual content based on the context of the capture of the visual content by the image capture device.

17. The system of claim 1, wherein the weight balance parameter value controlling the extent to which the placement of the viewing window minimizes the combination of the rotational velocity and the rotational acceleration of the image capture device includes the weight balance parameter value controlling whether a fixed-viewpoint stabilization, a flowing motion stabilization, or a mix between the fixed-viewpoint stabilization and the flowing motion stabilization is used for the visual content.

18. The method of claim 9, wherein the weight balance parameter value controlling the extent to which the placement of the viewing window minimizes the combination of the rotational velocity and the rotational acceleration of the image capture device includes the weight balance parameter value controlling whether a fixed-viewpoint stabilization, a flowing motion stabilization, or a mix between the fixed-viewpoint stabilization and the flowing motion stabilization is used for the visual content.

19. A system for dynamic stabilization adjustment, the system comprising:
    one or more physical processors configured by machine-readable instructions to:
        obtain visual information defining visual content of a video, the visual content captured by an image capture device during a capture duration, the visual content having a field of view;
        assess context of the capture of the visual content by the image capture device, the context of the capture of the visual content by the image capture device includes a motion type or a mounting type of the image capture device;
        determine one or more stabilization parameter values for the visual content based on the context of the capture of the visual content by the image capture device, the one or more stabilization parameter values controlling placement of a viewing window within the field of view of the visual content for stabilization of the visual content, the viewing window defining an extent of the visual content to be included within a punchout of the visual content for the stabilization of the visual content, wherein the one or more stabilization parameter values include a weight balance parameter value, the weight balance parameter value controlling an extent to which the placement of the viewing window minimizes a combination of rotational velocity and rotational acceleration of the image capture device; and
        effectuate the stabilization of the visual content based on the one or more stabilization parameter values.

20. The system of claim 19, wherein the weight balance parameter value controlling the extent to which the placement of the viewing window minimizes the combination of the rotational velocity and the rotational acceleration of the image capture device includes the weight balance parameter value controlling whether a fixed-viewpoint stabilization, a flowing motion stabilization, or a mix between the fixed-viewpoint stabilization and the flowing motion stabilization is used for the visual content.

\* \* \* \* \*